United States Patent [19]

Nordyke

[11] Patent Number: 4,921,384
[45] Date of Patent: May 1, 1990

[54] SWAGE FASTENERS WITH A HIGH STAND-OFF COLLAR

[75] Inventor: Keith D. Nordyke, Irvine, Calif.

[73] Assignee: Federal-Mogul Corporation, Southfield, Mich.

[21] Appl. No.: 362,738

[22] Filed: Jun. 7, 1989

[51] Int. Cl.$^5$ .......................................... F16B 19/08
[52] U.S. Cl. ................................... 411/361; 411/436
[58] Field of Search ................ 411/361, 360, 39, 260, 411/261, 501, 277, 276, 1, 285, 2, 500, 337, 436, 333, 334, 335, 336

[56] References Cited

U.S. PATENT DOCUMENTS

| | | | |
|---|---|---|---|
| 2,531,048 | 11/1950 | Huck | 411/361 |
| 2,531,049 | 11/1950 | Huck | 411/361 |
| 2,804,798 | 9/1957 | Brilmyer | 411/361 |
| 3,057,246 | 10/1962 | Brilmyer | 411/361 |
| 3,215,024 | 11/1965 | Brilmyer et al. | 411/361 |
| 3,290,982 | 12/1966 | Marschner | 411/361 X |
| 3,915,053 | 10/1975 | Ruhl | 411/361 |
| 4,867,625 | 9/1989 | Dixon | 411/361 |

Primary Examiner—Rodney M. Lindsey
Attorney, Agent, or Firm—Lawrence J. Shurupoff

[57] ABSTRACT

A swage type fastener including a pin and a collar adapted to be swaged onto the pin by the application of a relative axial force by an installation tool, with the pin having a lockgroove portion, a tubular collar having an inner and outer end and adapted to be located on the pin and having a collar shank portion adapted to be swaged into the lock groove portion by the relative axial force applied between the pin and the outer end of the collar by the installation tool, the collar having a through bore which has a reduced diameter bore portion whereby the collar is generally piloted on the pin, and the collar shank portion being generally frusto conically shaped from the reduced diameter bore portion to an enlarged bore portion at the outer end, the collar shank portion having a generally uniform wall thickness from the outer end for a distance over its swageable length whereby the frusto conical shape of the collar shank portion provides a high hold-off to resist initiation of swage of the outer end of the collar into the locking grooves of the pin and whereby the generally uniform wall thickness provides for a generally uniform fill of the lock groove portion substantially without distortion.

25 Claims, 4 Drawing Sheets

SWAGE FASTENERS WITH A HIGH STAND-OFF COLLAR

SUMMARY BACKGROUND OF THE INVENTION

The present invention relates to multi-piece fasteners and more particularly to a swage type fastener for clamping workpieces together under a high initial preload prior to initiation of swage.

The present invention generally relates to two-piece swage type fasteners or lockbolts of the type illustrated in U.S. Pat. No. 3,915,053 to J. Ruhl, issued Oct. 28, 1975, U.S. Pat. No. 2,531,048 to L. Huck, issued Nov. 21, 1950 and to U.S. Pat. No. 3,057,246 to H. G. Brilmyer, issued on Oct. 9, 1962. The present invention is also an improvement upon U.S. Pat. Application Ser. No. 282,875 now U.S. Pat. No. 4,867,625 by Richard D. Dixon for Variable Clamp Fastener and Method filed on Dec. 9, 1988 and copending U.S. Pat. Application Ser. No. 328,305 by Shahriar M. Sadri for Fit Up Swage Fastener With A Variable And Selectively High Initial Clamp Pre-load And Method filed on Mar. 24, 1989. In addition the present invention could utilize the groove shape and concepts of U.S. Pat. Application Ser. No. 185,327 by Richard D. Dixon for High Strength Fastener and Method filed on Apr. 20, 1988. All of the above patents and noted patent applications of Dixon (but not Sadri) can be considered as prior art relative to the present invention.

In one form, the fastener of the present invention, as with the prior art noted, includes a pin and a collar adapted to be swaged into lock grooves in the pin in response to a preselected relative axial force applied between the pin and collar. In lockbolt type constructions, the collar transmits an axial force from the swage anvil of the setting tool to the workpiece surface engaged by the collar. The pin transmits an opposite axial force by virtue of a pulling force exerted by the tool as with a pull type fastener or a reaction force on the pin as with a stump type fastener. The final clamp load on the workpieces can be determined first by the initial magnitude of relative axial force before initiation of swaging the collar onto the pin and thereafter by elongation of the collar in response to swage. The initial axial clamp force on the workpieces is sometimes referred to as "pre-load" while the final clamping force after full swage is referred to as "final clamp load". The beginning of swaging at this pre-load is sometimes referred to as "primary clinch". In many applications it is desirable to provide a high level of pre-load. In these cases the relative geometries of the swage anvil and engaging end of the collar are selected to provide hold-off or stand-off of initial swage until the desired pre-load value is attained. Thus U.S. Pat. No. 2,531,049 issued Nov. 21, 1950 to L. C. Huck shows a collar having a frangible flange to assist in stand-off of initiation of swage. The companion U.S. Pat. No. 2,531,048 issued Nov. 21, 1950 to L. C. Huck shows a collar with an enlarged bead to assist in stand-off. A modified form of collar and bead structure is shown in the U.S. Pat. No. 2,804,798 issued Sept. 3, 1957 to H. G. Brilmyer. The beaded structures provide an increase in hoop strength by virtue of a localized area at the front or outer end of the collar having an increased wall thickness and hence increased volume of collar material.

One of the problems, however, with the provision of a bead on the collar for increased stand-off is that the collar now has an uneven distribution of material over its length. This can result in unequal filling of the pin lock grooves and, perhaps more importantly, could result in excessive collar material being moved radially inwardly into the pin lock grooves resulting in local necking of the pin and potential loss of overall strength of the set fastener. This problem is compounded where the collar is swaged into lock grooves which are helical threads. Here it may be desirable to remove the collar by unthreading it from the pin. Excessive necking could distort the threads and severely inhibit such removal making disassembly of secured parts more difficult.

The present invention presents a unique response to the problem of providing a swage fastener having a high stand-off capability while providing generally equal groove fill in the pin and minimizing localized pin distortion. This is accomplished by constructing the collar to be generally conically shaped over the portion to be swaged; thus the collar is of a generally uniform wall thickness with the inside and outside diameters increasing in an axial direction from the inner end to its enlarged outer end. The result is a relatively small but significant radial gap separating the inner surface at the outer end of the collar from the lock grooves; this radial separation along with the conical shape serves a purpose to be seen. At the same time, since the wall thickness of the collar is maintained generally uniform throughout its swageable length, the volume of material available to be swaged into the lock grooves of the pin will be generally the same across the swage area. Thus a more uniform fill will be achieved while pin necking will be minimized.

In some applications it may be desirable to provide a pin and collar combination in which there is a predetermined amount of "overpack". Overpack occurs where the volume of collar material to be swaged in the pin lock grooves is greater than the available volume defined by the confronting volume of the cavity of the swage anvil and the pin lock grooves. The collar construction of the present invention provides for a more uniform overpack condition over its swageable length.

As can be seen from the prior art patents, the outer end of the collar is frequently provided with a chamfered surface adapted to engage a mating surface on the anvil of the installation tool. The angle of this chamfer will have an effect on the magnitude of the component of the axial force directed radially inwardly to cause swaging. With the present invention, the outer end is tapered to a large diameter and is of a lesser thickness than its beaded counterpart; by selecting the stand-off angle of the chamfer to control the radially inward component of force, this, in addition to the conical construction, will result in a collar having equal or higher stand-off values than the beaded collar. In this regard it is believed that the conical structure and resultant circumferential gap require extra energy in swage before the initiation of "primary clinch". It is believed that this combination of factors assists in resisting the radial inward force component and provides a desired high stand-off.

The collar can be constructed with a straight shank which is radially expanded to the desired conical shape. Where no further thermal processing is employed, it is believed that the increase in strength at the outer end resulting from cold working in this radial expansion step provides additional resistance to radially inward deformation. Thus the desired magnitude of stand-off force will be determined by the balance in hoop strength, resulting from the conical shape and enlarged mean diameter and circumferential gap at the outer end, the selection of the angle of the stand-off chamfer, and, where present, the gradient of increasing hardness at the expanded end of the collar. As noted it is believed that the conical shape and resultant significant radial gap between the inner surface of the collar and pin lock grooves, permits an initial radially inward deflection, providing energy absorption, while still resisting the initial engagement in "primary clinch". In addition, the advantages, previously noted, of uniform fill can be realized.

Since one of the advantages of the novel collar structure, in contrast to a beaded structure, is to provide equal and/or increased pre-load while minimizing distortion of the pin grooves, it can also be used advantageously in conjunction with the fit up swage type fasteners as shown in the referenced applications of Dixon and S. M. Sadri. In this regard the Dixon and Sadri applications are incorporated herein by reference. This is especially true in certain applications, such as truck frames, where it is important that the integrity of the helical lock grooves be maintained such that the swaged collar can be removed by unthreading from the threaded pin.

As noted in the '875 Dixon application, the fit up fastener disclosed is an improvement over conventional threaded fasteners traditionally used in applications requiring a pre-assembly before final tightening of the fasteners. Thus it is common to secure a structure first by attaching the associated members with the threaded fasteners loosely engaged or torqued to be partially tightened. This facilitates adjustment and/or alignment of the structural members to a final, desired orientation even by partial loosening of the fasteners if necessary. After such adjustment and/or alignment, the threaded fasteners are tightened to a preselected final torque. Two-piece swage type fasteners are not confronted with frictional and other problems inherent in threaded fasteners and hence can provide more uniformly predictable clamp loads. However, until the construction shown in the '875 Dixon and Sadri applications, the swage type fasteners have not been capable of providing the initial pre-assembly or clamp up available with threaded fasteners and still provide a full clamp with only a second, final installation step.

In the noted '875 Dixon and Sadri applications, the lock grooves of the pin are in the form of a helical male thread. The collar is provided with a mating, female thread of a preselected extent such that the initial pre-assembly or clamp can be accommodated. However, the female collar thread is selected to be of a limited circumferential extent and shear strength such that the collar can be brought to its final, desired clamp position and swaged to the pin via a conventional installation tool. Thus for the final installation, a conventional pull tool can be used to apply a relative axial force between the pin and the collar. The female collar thread is selected such that, in response to the relative axial force and at a level prior to the initiation of collar deformation or swaging (primary clinch) into the lock grooves of the pin, it will shear or deform such that the collar will be free to move axially over the pin and to respond to the installation loads in the same manner as a collar without such female thread form. Now the workpieces can be finally clamped together with the same effectiveness as typical swage type fasteners.

In numerous building construction situations, the structure being built may be first pre-assembled in one position or location and then erected or moved to its ultimate position or location where the final assembly takes place. In such conditions, since these pre-assemblies can be quite large, the fasteners can be subjected to separation or handling loads of significant magnitudes. In other applications a high initial clamp load via torquing is desirable where the workpieces are fully engaged. In those situation, a substantially limited thread may not have sufficient strength to withstand such loads. In the Sadri application, while a limited thread form is used, the latter conditions are accommodated by the use of more or higher strength collar threads for engagement with corresponding pin threads. With more threads or a thread form having a higher shear strength, however, the attainment of the desired final clamp load in swage could be inhibited by the resistance of the engaged thread or threads to axial movement of the collar. In addition the workpieces could be firmly pulled together with no remaining gap and hence no axial movement of the collar would be available whereby the desired shearing or deformation of the collar threads would be inhibited. To overcome these problems the Sadri collar is provided with a dished flange at its workpiece engaging end. The flange acts as a spring or resistance member such that it will resist high separation loads and/or the torque load for an initial high pre-assembly, pre-load but can deflect or collapse upon application of the axial loads in swaging the collar for the final clamp up. Thus the dished flange will permit axial movement of the threaded portion of the collar such that the engaged collar thread or threads have been sheared and/or deformed sufficiently to permit substantially uninhibited transfer of the relative axial force between the pin and collar to provide the desired final clamp load to the workpieces.

However, in order to be able to shear or deform the increased number (or higher strength) of the engaged threads before swage, the collar must be capable of providing a high stand-off load. This is accomplished by one form of the present invention.

In some applications it is desirable that the fasteners have a high strength, high performance characteristic both in clamp up and in fatigue. In this latter regard then, it may be advantageous to utilize the groove shape and concepts of the invention of the '327 and '875 applications of Dixon.

Thus, in one form of the present invention, the lock grooves in the pin are very shallow and are constructed to have roots of a simulated streamlined shape. The lock grooves are helical and define a desired thread configuration. The shallow grooves and simulated streamlined shape, however, provide a resultant fatigue life which is superior to that of a comparable threaded fastener. Since the preceding construction is shown and described in the noted applications and since the present invention is not restricted to such a construction the details thereof, while incorporated by reference, have been omitted for purposes of simplicity.

Thus it is an object of the present invention to provide a novel swage type fastener utilizing a unique collar construction having high stand-off capabilities and providing generally uniform fill of the lockgrooves of the pin.

It is another object of the present invention to provide a unique collar construction for a swage type fastener having high stand-off capabilities.

It is still another object of the present invention to provide a collar of the above described type which provides a high stand-off capability while local necking of the pin in the area of swage is inhibited.

It is still another object of the present invention to provide a collar of the above described type which provides a high stand-off capability while local necking of the pin in the area of swage is inhibited such that where the lock grooves are defined by a helical thread form the distortion of the pin threads will be minimized.

It is another object of the present invention to provide a novel fit up fastener of the above described type utilizing the unique tapered or conical collar having high stand-off capabilities.

It is a general object of the present invention to provide a novel swage type fastener.

Other objects, features and advantages of the present invention will become apparent from the subsequent description and the appended claims, taken in conjunction with the accompanying drawings, in which:

Figure 1:
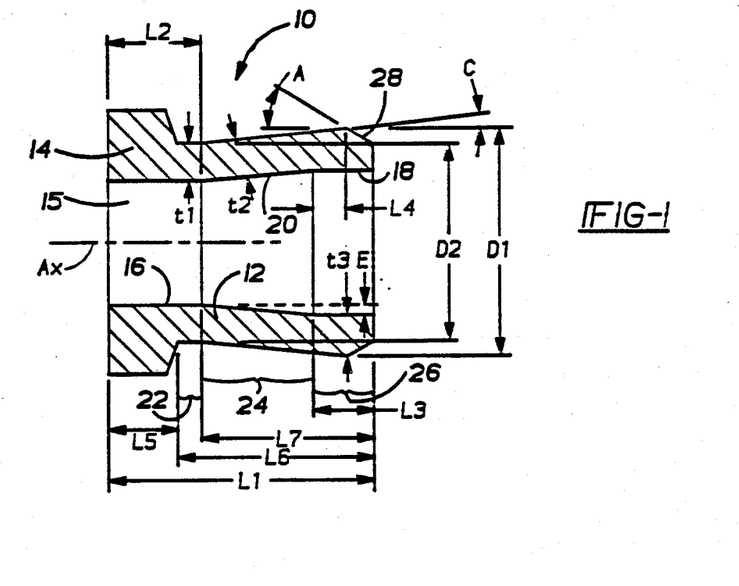
FIG. 1 is a longitudinal sectional view of a collar embodying features of the present invention.

Looking now to FIG. 1, a tubular collar 10 for use with a swage type fastener is shown. As will be seen the collar 10 is adapted to be swaged into locking grooves in an associated pin which is a part of the combination defining the swage type fastener.

The collar 10 has a shank 12 terminating at its inner end in an enlarged generally annular flange 14. The collar 10 has a through bore 15 defined by a first generally straight reduced diameter bore portion 16 located at and extending partially beyond the flanged end and an enlarged diameter generally straight bore portion 18 at its opposite, outer end. An intermediate bore portion 20 is generally frusto-conically shaped and inclines or tapers radially outwardly as it connects the bore portions 16 and 18. The collar shank 12 has a generally straight reduced diameter outer surface over a collar portion 22, which is radially in line with the extended part of reduced diameter bore portion 16 to define a generally uniform wall thickness t1. The outer surface is then tapered over an intermediate portion 24 and is generally frusto-conically shaped to be generally parallel with the radially inclined intermediate bore portion 20. Over the length of outer surface portion 24, the collar shank 12 has a generally uniform wall thickness t2 which is generally equal to wall thickness t1.

The outer surface of intermediate portion 24 continues its inclination generally at the same angle over the majority of the surface of an end portion 26. The end portion 26 is coextensive with the straight, enlarged bore portion 18. The outer surface of end portion 26 terminates in a stand-off chamfer 28 which is inclined at an Angle A relative to the axis Ax of the through bore 15. The magnitude of radially compressive force applied by a swage anvil of an installation tool in swaging the collar 10 onto an associated pin is determined in part by the angle (A) of the stand-off chamfer 28, which transfers load axially and radially for a given applied force via the anvil.

The wall thickness at the outer end portion 26 of collar shank 12 will generally increase slightly in thickness from that of t1 and t2 to a maximum thickness t3 at the intersection with stand-off chamfer 28. The increase in wall thickness to thickness t3 provides an additional volume of material; this slight addition in material volume compensates for the collar material which is forwardly extruded in swage and hence provides for a more uniform fill of the pin lock grooves throughout the length of the swaged portion of collar shank 12.

Thus as noted the collar 10 because of the radially outwardly tapered or conical shape of its shank 12 will provide the desired stand-off but in addition, because of its generally uniform wall thickness, will provide a generally uniform fill of the lock grooves of the associated pin over the swaged area without excessive necking of the pin and hence with minimal distortion of the lock grooves. The minimization of distortion of the pin grooves is of special importance where they are of a helical thread form.

Figure 2:
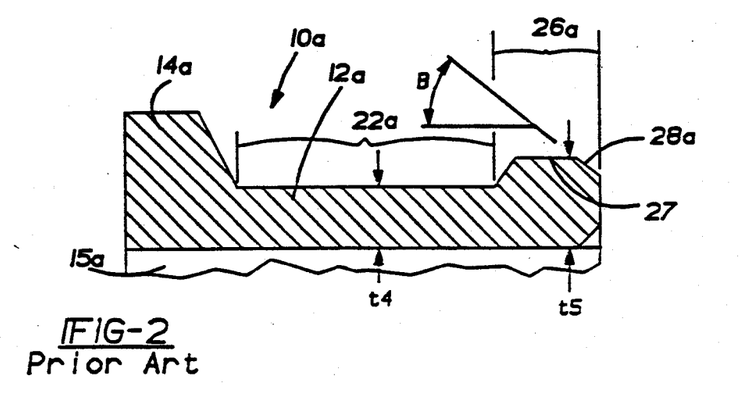
FIG. 2 is a fragmentary longitudinal sectional view of a prior art collar utilizing a beaded construction for stand-off.

A comparison of the structure of the present invention with a collar having a prior art beaded construction can be seen from an examination of FIGS. 1 and 2. In the description of the collar of FIG. 2, portions similar to like portions of the collar 10 of FIG. 1 will be given the same numerical designation with the addition of a postscript "a".

Thus in FIG. 2 the collar 10a has a shank 12a terminating at its inner end in an enlarged flange 14a. The collar 10a has a through bore 15a of a generally uniform diameter. The collar shank 12a has a generally straight outer surface portion 22a which, over its length, defines a generally uniform wall thickness t4. The wall thickness t4 for a comparable fastener application is generally equal to the wall thickness t1, t2 of the collar 10 of FIG. 1.

The outer surface of the shank portion 12a terminates in an outer end portion 26a having an enlarged circumferential bead 27 which defines a wall thickness increasing to a maximum thickness t5 which is substantially greater than wall thickness t4. The increased thickness t5 of the bead 27 extends substantially over the length of outer end portion 26a which terminates in a stand-off chamfer 28a. The chamfer 28a inclines radially at an angle B and serves a purpose similar to that of chamfer 28.

Thus the prior art construction achieves the required high stand-off strength by forming a circumferential bead at the top or outer end of the collar. This high stand-off strength is due, in part at least, to the substantial increase in collar material of the bead 27, i.e. defined by thickness t5. As noted the chamfer angle B will effect the magnitude of radially compressive force resulting from a given axial load applied by the swage anvil. The chamfer angle B in some cases could be the same as chamfer angle A for the collar 10 of the present invention.

With a collar 10a of the prior art design, the stand-off requirement for a swage type fastener can be met. But the increase in volume of material at the bead 27 selected to provide the desired stand-off, as noted, can cause high localized necking of the associated pin in the area of swage.

With the frusto-conical collar 10 of the present invention, as shown in FIG. 1, the necessary radially compressive strength or hoop strength and/or stand-off is achieved while still providing a generally uniform volume over its swageable length. Thus the tapered collar 10 maintains a generally constant cross-sectional area along the swage length of the collar shank 12. In a sense it is a straight tubular shape which has had its inner and outer diameters expanded radially outwardly.

It is frequently desirable that the volume of collar material in the swage area be selectively greater than the available volume between the pin lock grooves and the cavity of the swage anvil. Where such an overpack condition is desired, theoretically, the design of the present invention will provide a generally uniform percentage of overpack over the swage length of the collar shank 12.

The present invention is illustrated, by way of example, with a collar 10 for a ⅝ inch diameter pin generally having SAE Grade 8 properties with the collar 10 generally having around the following dimensions (see FIG. 1):

1. Diameter of Bore Portion 16 = 0.630 inches.
2. Diameter of Bore Portion 18 = 0.730 inches.
3. Maximum Outside Diameter D1 of Shank 12 = 1.106 inches.
4. Minimum Outside Diameter D2 of Shank 12 = 0.805 inches.
5. t1 = t2 = 0.175 inches.
6. t3 = 0.188 inches.
7. L1 = 1.07 inches.
8. L2 = 0.400 inches.
9. L3 = 0.25 inches
10. L4 = 0.16 inches.
11. L5 = 0.29 inches (Flange 14).
12. L6 = 0.78 inches (Shank 12).
13. L7 = 0.67 inches (Taper).
14. Chamfer Angle A = 25°.
15. Taper Angle C = 7°.
16. Radial Gap E = 0.05 inches.
17. Radial Pilot Clearance at Bore Portion 16 = 0.0025 inches.

Thus the maximum volume of collar material represented by the maximum thickness t3 over a finite length of uniform thickness would be around 8% greater than that for collar thicknesses t1, t2; the increase in the thickness is gradual up to the maximum thickness t3 which occurs essentially at only one point; thus the average increase in volume over the length L4 is around 4%. Since the length L4 is around 20% of the total length L6 of the collar shank 12, the slight increase in volume noted is gradually distributed over that 20% portion. As noted the resultant slight increase in volume is provided to compensate for material which is extruded forwardly during swage and hence assists in providing a uniform fill of the pin lock grooves at the forward or outer end portion 26 of the collar 10.

It will be seen that the inside diameter at outer end portion 26 provides a substantial radial clearance with the confronting lock groove portion of a pin. Thus, when the tapered outer end portion 26 initially deflects radially inwardly under load, the radial clearance will permit elastic deflection while precluding premature engagement with the pin lock grooves and hence further assists in providing high stand-off loads. With the collar 10 as noted for use with a ⅝ inch diameter pin the radial clearance or gap E at the outer end portion 26 will be around 0.05 inches or around 8% of the nominal ⅝ inch diameter of the corresponding pin. Note the radial gap extends over the length L3 which is approximately around one third (⅓) of the length L6 of the collar shank 12. At the same time the radial clearance with the pin at reduced diameter bore portion 16 will be around 0.0025 inches whereby the bore portion 16 will act to pilot the collar 10 onto its associated pin. Note that the radial gap E is provided by a gradually tapering structure which extends over a substantial portion (L7) of the length (L6) of the collar shank 12. Thus the gap E is provided generally without an abrupt change in cross section of the collar shank 12. As indicated, the angle of taper C for the noted fastener was around 7°.

Figure 3:
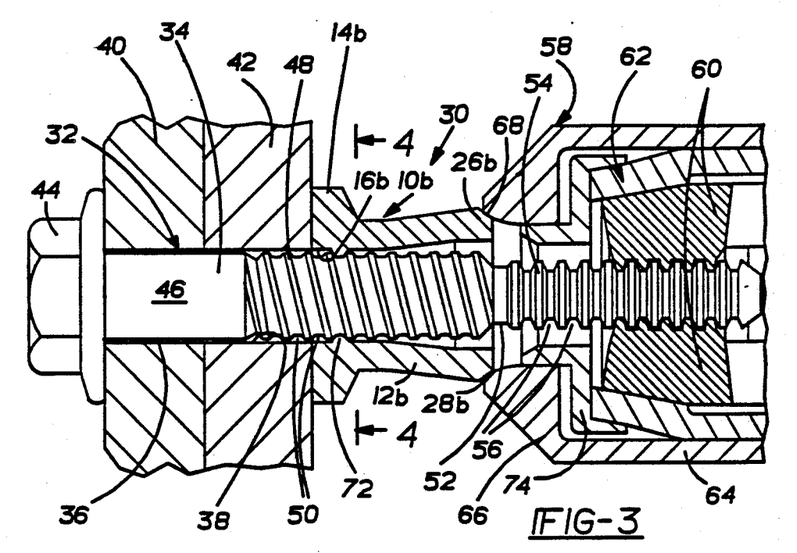
FIG. 3 is a longitudinal view with some portions shown in section and others shown broken away of a fastener of the present invention including a pin and a collar similar to that of Figure but adapted for use in combination as a swage type fit up fastener and shown in assembly relationship with workpieces and with the workpieces being pre-assembled via torque applied to the fastener to provide an initial clamp load and with a portion of a pull tool shown as applied to the fastener prior to initial swage, i.e. primary clinch, of the collar into the lock grooves of the pin.
Figure 4:
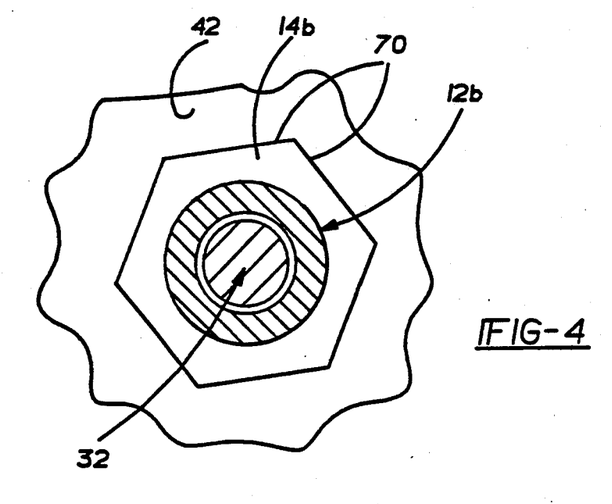
FIG. 4 is an enlarged sectional view of the fastener of FIG. 3 taken in the direction of the Arrows 4—4 depicting the fastener with the collar having flats to be gripped by a conventional torquing tool (not shown)

As shown in FIGS. 3 and 4, a modified form of the collar 10 of FIG. 1 can be advantageously used in a combination as a fit up fastener. In the description of the embodiment for the fit up fastener shown in FIGS. 3 and 4 components similar to like components in FIG. 1 will be given the same numerical designation with the addition of the letter postscript "b".

Looking now to FIGS. 3 and 4, a fastener 30 is shown to include a pin member 32 and a tubular collar 10b. Pin member 32 has an elongated shank 34 which extends through aligned openings 36 and 38 in a pair of workpieces 40 and 42, respectively, to be secured together. An enlarged protruding head 44 at one end of shank 34 engages one side of workpiece 40. Adjacent the head 44, the shank 34 has a straight portion 46 which is adapted to be received within the aligned bores or openings 36 and 38 with a clearance fit. Following the straight portion 46 is a lock groove portion 48 defined by a plurality of grooves 50 having a continuous, helical thread form.

A breakneck groove 52 is located between the lock groove portion 48 and a gripping or pull portion 54 and defines the weakest portion on the shank 34. The pull portion 54 is comprised of a plurality of annular pull grooves 56 which are of a reduced diameter relative to the straight shank portion 46 and the lock groove portion 48. The pull grooves 54 are adapted to be gripped by a tool 58 which is actuable to set the fastener 30. The tool 58 can be generally constructed in a manner known to those skilled in the art and hence is only partially shown for purposes of simplicity. Briefly, the tool 58 has a plurality of jaws 60 adapted to grip the pin member 32 at pull grooves 56. Jaws 60 are located in a tubular collet assembly 62 which is slidably supported in an anvil housing 64 which terminates at one end in a swage anvil 66 having an entry or mouth portion 68.

As shown, the tubular collar 10b has an enlarged flange 14b. Both the pin head 44 and collar flange 14b can be provided with wrenching flats or irregularities to facilitate gripping by a wrench or other suitable tool for applying a relative torque between the pin member 32 and collar 10b. Thus looking now to FIG. 4, the flange 14b can be provided with a plurality of flats 70 to facilitate gripping to a conventional tool or wrench (not shown).

The small diameter bore portion 16b of the collar 10b is of a diameter to be in clearance with the portion of the pin shank 34 extending past workpiece 42; a limited female thread 72 is formed at the flange end of the bore portion 16b and is adapted to complementarily, threadably engage the helical lock grooves or threads 50 of pin 32. The shape of the collar threads 72 is substantially the same as the shape of the pin threads 50 for providing good mating engagement. Thus in this case the latter threaded engagement provides a piloting action for locating the collar 10b onto the pin 32.

In operation, the workpieces 40 and 42 can be first joined together by the threaded engagement between the collar thread 72 and the threaded lock grooves 50. The pull portion 54 has a maximum diameter less than the inside diameter of the collar thread 72 so that the collar 10b can be moved onto the pin 32 and collar thread 72 readily applied to the threaded lock groove portion 48. The number of threads 72 of the collar 10b is selected to permit the collar 10b to be torqued to provide a desired pre-assembly, initial clamp force between workpieces 40 and 42 and/or to resist anticipated separating or handling forces between the workpieces 40 and 42.

With this structure, after the torquing and pre-assembly operation, the fastener 30 can now be finally set by the application of a relative axial force. Thus after the pre-assembly has been accomplished the installation tool 58 is applied to the fastener 30 as shown in FIG. 3 and a relative axial force is applied between the pin 32 and collar 10b via the jaw assembly 60 gripping the pull groove portion 54 and the swage surface of the mouth portion 68 of swage anvil 66 engaging the stand-off chamfer 28b at the outer end of the collar 10b. As the relative axial force increases, the limited collar threads 72 will shear or deform sufficiently to permit the collar shank 12b to move further axially relative to the pin 34. In this condition, however, the swaging or deformation of the material of the collar 10b into the pin lock grooves 50 has not yet started and, hence, the pin 32 and collar 10b can now respond as a typical swage type fastener; thus now the workpieces 40 and 42 are pulled together at a preselected load by the relative axial force applied by the installation tool 58 between the pin 32 and collar 10b the same as if the collar 10b had not been threadably engaged with the pin 32, and, as the axial force increases, swaging of the collar 10b into the helical lock groove portion 48 begins. Upon the completion of swaging and as the axial force continues to increase, a magnitude will be attained at which the pin 32 will fracture at the breakneck groove 52 completing the swaging operation (see FIG. 5). Subsequently, upon further actuation of the tool 58, a collar ejector member 74 will be urged forwardly to eject the swaged collar 10b from the anvil 66 thus completing the installation.

Figures 5, 6:
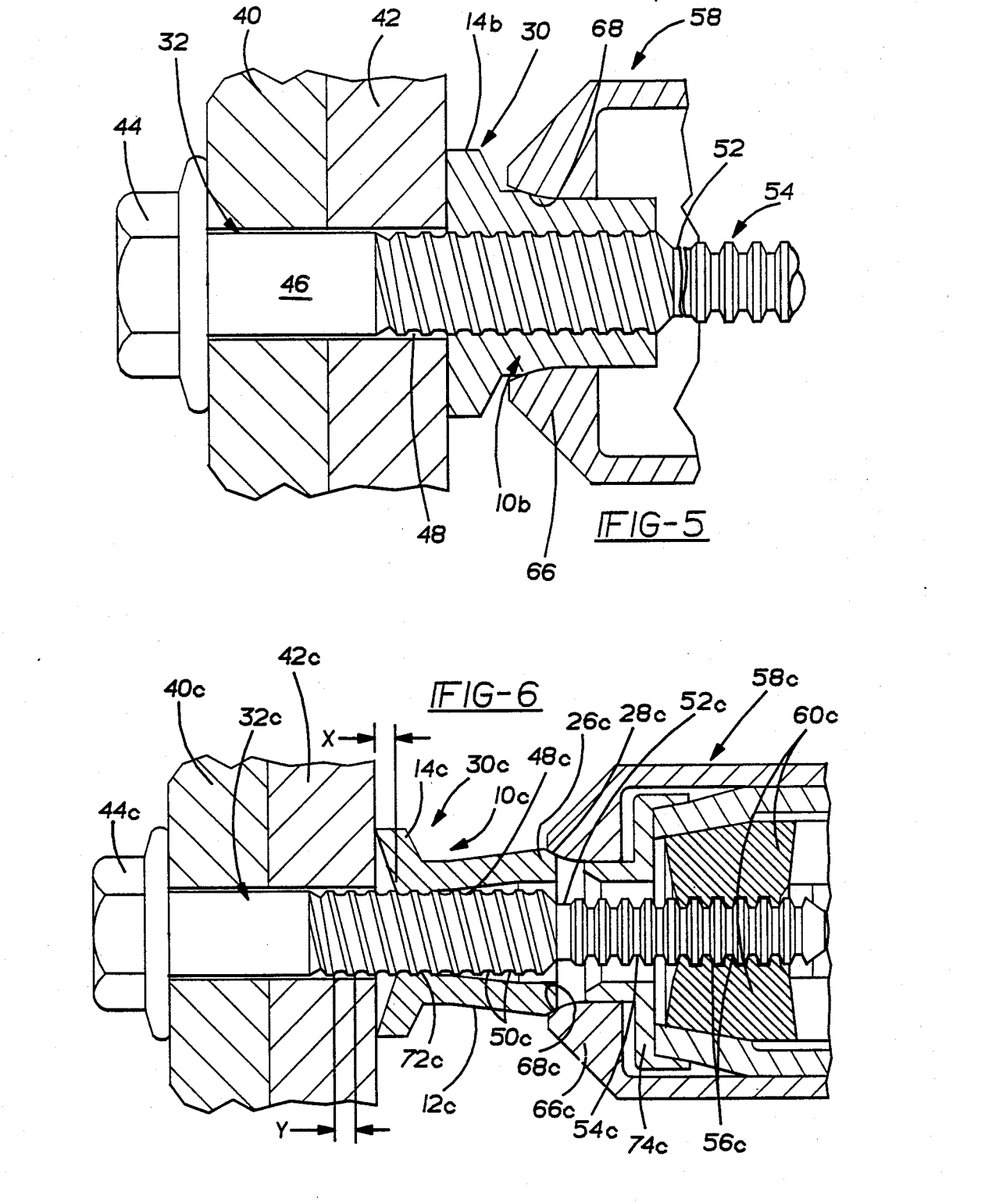
FIG. 5 is a longitudinal view similar to that of FIG. 3 depicting the fastener after it has been set.
FIG. 6 is a longitudinal view with some portions shown in section and others shown broken away of a modified swage type fit up fastener with the collar including a deformable flange and depicting the fastener after it has been torqued to a desired pre-load and with the deformable flange on the collar shown partially deformed to hold workpieces in a pre-assembly and with a portion of a pull tool shown as applied to the fastener prior to initial swage, i.e. primary clinch, of the collar into the lock grooves of the pin.

Thus the workpieces 40 and 42 will be secured together under a final clamp load substantially the same as if the initial pre-assembly via the threaded fit up connection had not occurred.

As noted, the enlarged diameter outer portion 26b of tapered collar 10b will provide stand-off resistance to initial swage, i.e. primary clinch. In this regard, as discussed, the interaction of the swage surface of mouth portion 68 of the anvil 66 and the angle of the stand-off chamfer 28b are such as to assist in providing a preselected stand-off whereby initiation of swaging of the collar 10b into the lock grooves 50 will not begin until that lower magnitude of relative axial force has been attained which is sufficient to overcome any pre-load from pre-assembly torque, and to shear or sufficiently deform the limited collar threads 72.

As previously indicated, in some building construction applications a limited thread having more or stronger threads than the substantially limited thread form shown in the embodiment of FIGS. 3-5 may be desirable. In these circumstances the dished flange construction shown in the Sadri application could be advantageously utilized in connection with the conical or tapered collar construction of the present invention. This is shown in the embodiment of FIGS. 6 and 7 where components similar to like components in the embodiment of FIGS. 3-5 have been given the same numerical designation with the addition of the letter postscript "c".

Figure 7:
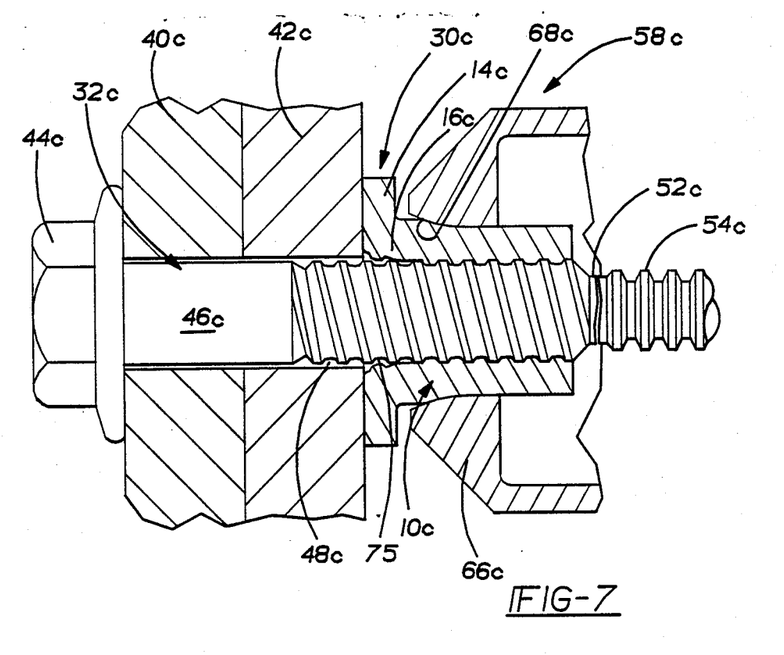
FIG. 7 is a view similar to that of FIG. 6 showing the assembly of FIG. 6 with the fastener after it has been set with the flange collapsed and collar swaged onto the pin to provide the desired final clamp load.

Looking now to FIGS. 6 and 7, a fastener 30c is shown to include a pin member 32c and tubular collar 10c. Pin member 32c is identical to pin member 32 of FIGS. 3-5 and hence that description will not be repeated, it being understood that the similarly numbered elements are the same as previously described.

Similarly, except for the construction of flange 14c and the use of threads 72c which include more threads than threads 72, the tubular collar 10c is the same as collar 10b and hence the description of the identical similarly numbered elements will not be repeated. Looking now to FIGS. 6 and 7, the flange 14c is dished concavely inwardly a preselected axial distance X from the radially and axially outer end to the radially and axially inner end. The distance X when the flange 14c is in a relaxed condition is selected to be no less than around one half the distance Y which is the pitch of the pin and collar threads 50c and 72c, respectively. The relaxed distance X is preferably greater than ½ Y for purposes to be seen.

In operation, the workpieces 40c and 42c can be first joined together by the threaded engagement between the collar threads 72c and the threaded lock grooves 50c. Again the pull portion 54c has a maximum diameter less than the inside diameter of the collar thread 72c so that the collar 10c can be moved onto the pin 32c and the collar thread 72c readily applied to the threaded lock groove portion 48c. The number of threads 72c of the collar 10c, while generally limited, is selected to be of sufficient strength to permit the collar 10c to be torqued to provide a desired high pre-assembly initial clamp force between workpieces 40c and 42c and/or to resist anticipated separating or handling forces between the workpieces 40c and 42c which are relatively high in magnitude. This embodiment of the invention permits an initial clamp force via torquing varying from a nominal clamp load to a clamp load having a magnitude at which the enlarged flange 14c can be deflected to reduce the distance X to a distance no less than around ½ Y. In this manner the workpieces 40c and 42c can be selectively clamped or located more or less relative to each other. Thus additional deflection of the flange 14c of at least around ½ Y, will still remain available for the swage operation to follow. This in turn will permit the collar shank 12c to axially move a distance of at least around ½ Y during the swage step but prior to initiation of swage, or initial deformation of the collar 10c into the lock groove portion 48c; thus as the relative axial force in the swage operation is applied between the pin 32c and collar 10c the collar shank 12c in moving at least the distance ½ Y will axially override the engaged threads whereby the desired final clamp load can be attained.

The magnitude of applied torque and hence of the initial deflection of the flange 14c can be controlled by a suitable torque controlled wrench. To this end suitable wrenching surfaces could be provided on the pinhead 44c and/or collar flange 14c. The maximum magnitude of torque applied to the fastener 30c will be limited such that the initial deflection of the flange 14c will still leave a pre-fastened or pre-clamped distance which is no less than around one half the thread pitch Y while at the same time maintaining the integrity of the collar threads 72c.

With this structure, after the torquing operation, the fastener 30c can now be finally set by the application of a relative axial force. Thus after the pre-assembly has been accomplished the installation tool 58c is applied to the fastener 30c, as shown in FIG. 6, and a relative axial force is applied between the pin 32c and collar 10c via the jaws 60c gripping the pull groove portion 54c and the swage anvil 66c engaging the outer end of the collar 10c. As the relative axial force increases, the collar threads 72c will shear or deform sufficiently to permit the collar shank 12c to move further axially relative to the pin 32c and to collapse the flange 14c. Thus where the workpieces 40c and 42c have been pre-clamped together, via torquing of the fastener 30, and where no gap exists therebetween, the collar flange 14c will collapse as the noted axial movement of the collar shank 12c occurs permitting the desired shearing and/or deformation of the collar threads 72c. In this condition, however, the swaging or deformation of the material of the collar 10c into the pin lockgrooves 50c has not yet started and, hence, the pin 32c and collar 10c can now respond as a typical swage type fastener; thus now the workpieces 40c and 42c are pulled together at a preselected load by the relative axial force applied by the installation tool 58c between the pin 32c and collar 10c, the same as if the collar 10c had not been threadably engaged with the pin 32c, and, as the axial force increases, swaging of the collar 10c into the helical lock groove portion 48c begins. Upon the completion of swaging and as the axial force continues to increase, a magnitude will be attained at which the pin 10c will fracture at the breakneck groove 52c completing the swaging operation (see FIG. 7). Subsequently, upon further actuation of the tool 58c, the collar ejector member 74c will be urged forwardly to eject the swaged collar 10c from the anvil 66c to complete the installation. Thus the workpieces 40c and 42c will be secured together under a final clamp load substantially the same as if the initial pre-assembly via the threaded fit up connection had not occurred. Note that as the flange 14c collapses the reduced diameter bore portion 16c can enlarge, as shown at 75 in FIG. 7 whereby disengagement of the threads 72c is further assisted.

Similarly as noted with the embodiment of FIGS. 3–5, the enlarged diameter outer portion 26c of tapered collar 10c will provide stand-off resistance to initial swage, i.e. primary clinch. In this regard, as discussed, the interaction between the mouth portion 68c of the anvil 66c and the angle of the stand-off chamfer 28c, as noted, are such as to assist in providing a preselected stand-off whereby initiation of swaging of the collar 10c into the lock grooves 50c will not begin until that lower magnitude of relative axial force has been attained which is sufficient to overcome any pre-load from preassembly torque, and to shear or sufficiently deform the more extensive but still limited collar threads 72c. Thus the minimum stand-off load capability of the collar 10c must be generally equal to the combination or sum of the loads required to overcome any axial pre-load on the fastener 30c, the axial load required to shear or deform the more extensive, but limited collar threads 72c, and the load required to collapse the dished collar flange 14c.

As noted in the Dixon applications and in the embodiment of FIGS. 3–5 and FIGS. 6 and 7, the pin 32, 32c can be provided with shallow helical grooves with a generally streamlined shape whereby a high strength construction can be achieved having a desirable high clamp load while at the same time maintaining the integrity of the thread form of the lock groove portion of the pin whereby torque can be applied for additional clamp up or collar removal. With the noted shallow groove structure, the volume of shank 12b, 12c of collar 10b, 10c was selected to generally provide 'overpacking', i.e., a volume of material to provide substantially more volume of collar material for filling pin grooves 50, 50c than is available within the swage envelope defined by the cavity of the swage anvil 66, 66c and the confronting lock grooves 50, 50c of pin 32, 32c. In that construction, it has been found desirable to provide a volume of collar material which has an excess of at least around 14% to around 16%. Typically the fastener 30, 30c could be constructed of materials generally having the strength characteristics of a Grade 5 threaded fastener.

To enhance the strength of fastener 30, 30c the width of the pin grooves 50, 50c and adjacent pin shoulders and the complementary grooves and shoulders of the swaged collar 10b can be proportioned in width relative to the respective shear strengths of the materials of pin 32, 32c and collar 10b, 10c such that both the shoulders defined by pin grooves 50, 50c of the pin 32, 32c and the shoulders defined by interlocking grooves of the swaged collar 10b, 10c are in incipient or simultaneous failure in shear at or above the preselected minimum ultimate design tensile load on associated workpieces 40, 40c and 42, 42c. It is preferred that the design provide for the shoulders defined by the grooves of collar 10b, 10c to fail prior to the shoulders defined by pin lock grooves 50, 50c., i.e. the shoulders of pin lock grooves 50, 50c would fail in shear at approximately 110% of the tensile load at which the shoulders of collar 10b, 10c would fail. By proportioning the grooves as noted, the engaged length of pin and collar can be minimized for a given tensile load. Of course, by providing sufficient collar length, the above shear strength relationship can be maintained while providing for a tensile failure diametrically across the pin lock groove portion 48, 48c.

Another advantage of employing proportioned strength as noted is that the shear strength of the collar threads 72, 72c can be maximized permitting the pre-fastened clamp via torquing to be at a relatively high magnitude and/or permitting the fastener 30, 30c in its prefastened clamp condition to withstand the necessary loads to hold the structure together during the fit up operation. This is achieved by virtue of the fact that the width of collar threads 72, 72c is substantially the same as the width of the groove of pin threads 50, 50c.

With the fastener 30, 30c installed, the swaged collar 10b, 10c will have a complementary female thread formed in its through bore. This will now permit the fastener 30, 30c to be removed by torquing the collar 10b, 10c off via suitable tools applied to wrenching surfaces on the pin head 44, 44c and/or the collar flange 14b, 14c.

The fasteners 32, 32c shown and discussed above are shown as pull type fasteners adapted to be finally installed by a conventional pull type tool 58, 58c. The features of the invention, however, are also applicable to a stump type fastener adapted to be finally installed by a squeeze type tool and/or to a pull type fastener having a pin which does not have a severable pintail and/or to a pull type blind fastener utilizing a swageable collar.

Thus when used with a pin in a combination as a fit up fastener the present invention provides a unique fastener permitting a variation in clamp load on the workpieces being connected while still permitting a high final clamp via a swaged connection between the pin and collar.

The unique construction of the present invention can be used in fastener combinations other than for fit up fasteners, i.e. blind fasteners, with pins having non-threaded pin grooves. It should also be noted that certain pin lock groove constructions may have grooves and crests which are non-uniform; however, even with this type of groove construction the collar of the present invention provides for a more uniform fill than the beaded prior art construction.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a swage type fastener including a pin and a collar adapted to be swaged onto the pin by the application of a relative axial force by an installation tool, the fastener comprising:
the pin having an elongated pin shank portion with a plurality of lockgrooves,
the collar being tubular and having an inner and outer end and adapted to be located on said pin shank portion and having a collar shank portion adapted to be swaged into said lock grooves by the relative axial force applied between said pin and said outer end of said collar by the installation tool, said collar having a through bore,
said through bore having a reduced diameter bore portion whereby said collar is generally piloted upon said pin shank,
said collar shank portion being generally frusto conically shaped from said reduced diameter bore portion to an enlarged bore portion at said outer end,
said collar shank portion having a generally uniform wall thickness from said outer end for a distance over its swageable length whereby the frusto conical shape of said collar shank portion provides a high hold-off to resist initiation of swage of said outer end of said collar into said locking grooves of said pin shank.

2. The fastener of claim 1 with said collar shank portion tapering at an angle of around 7°.

3. The fastener of claim 1 with said collar shank portion having a slight increase in wall thickness at said outer end.

4. The fastener of claim 1 with said collar shank portion having a slight increase in wall thickness at said outer end generally gradually increasing over a distance of approximately around 20% of the length of said collar shank portion.

5. The fastener of claim 1 with said collar shank portion having a slight increase in wall thickness at said outer end providing a generally distributed increase in volume of collar material at said outer end of around 4%.

6. The fastener of claim 1 with said collar shank portion having a slight increase in wall thickness at said outer end providing a generally distributed increase in volume of collar material of around 4%, said increase in volume being generally distributed over a distance of approximately around 20% of the length of said collar shank portion.

7. The fastener of claim 1 with said collar shank portion defining a preselected radial gap with said lock grooves at said outer end whereby initial engagement of said collar shank portion with said lock grooves is inhibited.

8. The fastener of claim 1 with said collar shank portion defining a preselected radial gap with said lock grooves at said outer end whereby initial engagement of said collar shank portion with said lock grooves is inhibited, said radial gap being around 8% of the nominal diameter of said pin.

9. The fastener of claim 1 with said collar shank portion having a hold-off chamfer at said outer end, said hold-off chamfer being at an angle of around 25° relative to the axis of said collar.

10. The fastener of claim 1 with said generally uniform wall thickness of said collar shank portion providing for a generally uniform fill of said pin lock grooves substantially over the swaged portion of said collar shank portion.

11. The fastener of claim 1 with said, generally uniform wall thickness of said collar shank portion providing for a generally uniform fill of said pin lock grooves substantially over the swaged portion of said collar shank portion, said generally uniform wall thickness of said collar shank portion providing substantially minimal distortion of said pin lock grooves.

12. The fastener of claim 1 with said generally uniform wall thickness of said collar shank portion providing for a generally uniform fill of said pin lock grooves substantially over the swaged portion of said collar shank portion, said pin lock grooves being in the form of a helical thread with said generally uniform wall thickness of said collar shank portion providing substantially minimal distortion of said pin lock grooves.

13. The fastener of claim 1 with said generally uniform wall thickness of said collar shank portion providing for a generally uniform fill of said pin lock grooves substantially over the swaged portion of said collar shank portion, said generally uniform wall thickness of said collar shank portion providing substantially minimal distortion and/or necking of said pin lock grooves at said outer end of said collar shank portion.

14. The fastener of claim 1 with said collar shank portion defining a preselected radial gap with said lock grooves at said outer end whereby initial engagement of said collar shank portion with said lock grooves is inhibited, said radial gap being around 8% of the nominal diameter of said pin, said radial gap extending for approximately around one third of the length of said shank portion.

15. In a fastening system including a fastener for securing workpieces together with a selectively variable clamp with said fastener adapted to be finally installed via a relative axial force applied by an installation tool, said fastener comprising:

a pin having an elongated shank terminating at one end in an enlarged pin head, a lock groove portion on said shank including a plurality of helically extending lock grooves defining a thread form, a tubular collar adapted to be located on said pin shank and to be swaged into said lock grooves in response to a first preselected magnitude of said relative axial force applicable by the installation tool, said collar having a through bore of a diameter to generally receive said lock grooves in clearance relationship, said collar having a female thread formed on said through bore and adapted to threadably engage said thread form defined by said lock grooves, whereby said collar can be torqued onto said lock groove portion to selectively clamp or locate the workpieces relative to each other more or less, said collar thread having a preselected strength selected to deform or shear relative to said lock grooves in response to a second preselected magnitude of said relative axial force applied between said pin and said collar by the installation tool with said second preselected magnitude being less than said first preselected magnitude, resistance means associated with said collar and said pin for permitting the workpieces to be initially clamped together under a preselected pre-load via torquing and thereafter being responsive to said relative axial force to permit relative axial movement between said collar and said pin of a sufficient axial distance such that said collar thread will deform or shear relative to said lock grooves with the movement of said axial distance and deforming or shearing of said collar thread occurring at a determinable magnitude of said relative axial force, said first preselected magnitude being greater than the combination of said determinable magnitude and said preselected pre-load whereby the final axial clamp up load of the workpieces is substantially uninhibited by the initial threaded engagement of said collar thread and said lock grooves, said through bore having a reduced diameter bore portion whereby said collar is generally piloted upon said pin shank, said collar having a shank portion of generally frusto conical shape from said reduced diameter bore portion to an enlarged bore portion at an outer end thereof, said collar shank portion having a generally uniform wall thickness from said outer end for a distance over its swageable length whereby the frusto conical shape of said collar shank portion provides a high hold-off to resist initiation of swage of said outer end of said collar into said locking grooves of said pin shank.

16. The fastener of claim 15 with said generally uniform wall thickness of said collar shank portion providing for a generally uniform fill of said pin lock grooves substantially over the swaged portion of said collar shank portion, said generally uniform wall thickness of said collar shank portion providing substantially minimal distortion of said pin lock grooves.

17. In a fastening system including a fastener for securing workpieces together with a selectively variable clamp with said fastener adapted to be finally installed via a relative axial force applied by an installation tool, said fastener comprising:

a pin member having an elongated shank terminating at one end in an enlarged pin head, a lock groove portion on said shank including a plurality of helically extending lock grooves defining a thread form, a tubular collar adapted to be located on said pin shank and to be swaged into said lock grooves in response to a first preselected magnitude of said relative axial force applicable by the installation tool, said collar having a through bore of a diameter to generally receive said lock grooves in clearance relationship, said collar having a limited female thread formed on said through bore and adapted to threadably engage said thread form defined by said lock grooves, whereby said collar can be torqued onto said lock groove portion to selectively clamp or locate the workpieces relative to each other more or less under a selectively variable torque whereby the workpieces can be selectively adjusted or aligned, said limited collar thread having a preselected strength selected to deform out of said lock grooves in response to a second preselected magnitude of said relative axial force applied between said pin member and said collar by the installation tool with said second preselected magnitude being less than said first preselected magnitude whereby said collar can be moved axially over said pin member after deformation of said limited collar thread and prior to initiation of swaging of said collar into said lock grooves, said through bore having a reduced diameter bore portion whereby said collar is generally piloted upon said pin shank, said collar having a shank portion of generally frusto conical shape from said reduced diameter bore portion to an enlarged bore portion at an outer end thereof, said collar shank portion having a generally uniform wall thickness from said outer end for a distance over its swageable length whereby the frusto conical shape of said collar shank portion provides a high hold-off to resist initiation of swage of said outer end of said collar into said locking grooves of said pin shank.

18. The fastener of claim 17 with said generally uniform wall thickness of said collar shank portion providing for a generally uniform fill of said pin lock grooves substantially over the swaged portion of said collar shank portion, said uniform wall thickness of said collar shank portion providing substantially minimal distortion of said pin lock grooves.

19. In a swage type fastener including a pin and a collar adapted to be swaged onto the pin by the application of a relative axial force by an installation tool, with the pin having an elongated pin shank portion with a plurality of lockgrooves, the fastener comprising:

the collar being tubular and having an inner and outer end and adapted to be located on the pin shank portion and having a collar shank portion adapted to be swaged into the lock grooves by the relative axial force applied between said pin and said outer end of said collar by the installation tool, said collar having a through bore, said through bore having a reduced diameter bore portion, said collar shank portion being generally frusto conically shaped from said reduced diameter bore portion to an enlarged bore portion at said outer end, said collar shank portion having a generally uniform wall thickness from said outer end for a distance over its swageable length whereby the frusto conical shape of said collar shank portion provides a high hold-off to resist initiation of swage of said outer end of said collar into the locking grooves of the pin shank.

20. The collar of claim 19 with said collar shank portion tapering at an angle of around 7°.

21. The collar of claim 19 with said collar shank portion having a slight increase in wall thickness at said outer end.

22. The collar of claim 19 with said collar shank portion having a slight increase in wall thickness at said outer end generally gradually increasing over a distance of approximately around 20% of the length of said collar shank portion.

23. The collar of claim 19 with said collar shank portion having a slight increase in wall thickness at said outer end providing a generally distributed increase in volume of collar material at said outer end of around 4%.

24. The collar of claim 19 with said collar shank portion having a slight increase in wall thickness at said outer end providing a generally distributed increase in volume of collar material of around 4%, said increase in volume being generally distributed over a distance of approximately around 20% of the length of said collar shank portion.

25. The collar of claim 19 with said collar shank having a hold-off chamfer at said outer end, said hold-off chamfer being at an angle of around 25° relative to the axis of said collar.

* * * * *